Sept. 21, 1954     P. L. KNIGHT     2,689,722

HEATING APPARATUS FOR SOAKING PITS

Filed April 6, 1950

INVENTOR.
P. L. Knight
BY Charles A. Lind
Attorney

Patented Sept. 21, 1954

2,689,722

UNITED STATES PATENT OFFICE 2,689,722

HEATING APPARATUS FOR SOAKING PITS

Philip L. Knight, Toledo, Ohio, assignor to Surface Combustion Corporation, Toledo, Ohio, a corporation of Ohio Application April 6, 1950, Serial No. 154,337

1 Claim. (Cl. 263—20)

A typical furnace (soaking pit) for heating steel ingots to rolling temperature comprises a heating chamber adapted to contain a plurality of said ingots standing on end, the heating chamber being also a combustion chamber; a waste gas flue leading from said combustion or heating chamber to a source of draft (such as a chimney); a recuperator interposed in said waste gas flue for preheating a current of air for combustion, and a hot fan interposed between said recuperator and the combustion chamber for drawing the heated air from the recuperator and delivering it under pressure to the burner for the combustion chamber. In a furnace of this type the temperature of the preheated air varies with the temperature of the flue gas hence the temperature of the air is low when the temperature of the flue gas is low as for example when the ingots are relatively cold.

The present invention is concerned with a furnace installation comprising a battery of furnaces of the type above described and has for its general object to coordinate the recuperators of the several furnaces or heating chambers in such a way that the heated streams of air from the several recuperators flow to an air collecting header for equalization of air temperature so that by drawing air from said header a chamber containing relatively cold work may receive hotter air for combustion than it would ordinarily receive from its own recuperator during the initial heating of the work.

For a consideration of what I consider to be novel and my invention, attention is directed to the following specification and the claim appended thereto.

In the accompanying drawing forming part of this specification:

Figure 2:
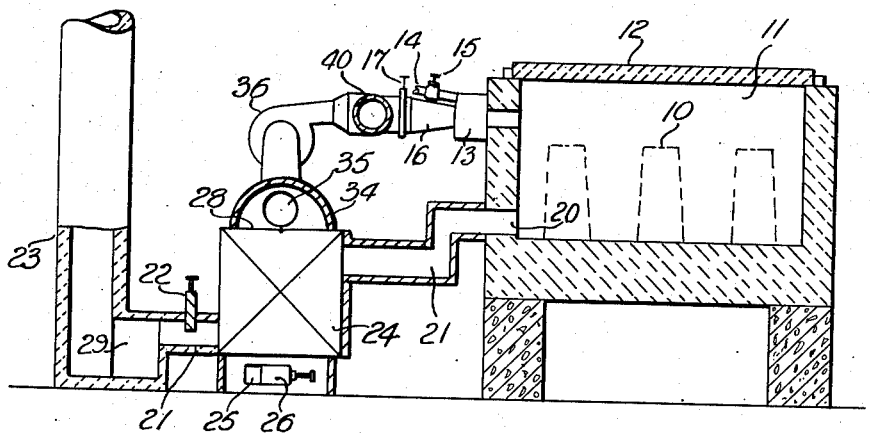
Fig. 2 is a vertical section on line 2—2 of Fig. 2.

As best shown in Fig. 2, steel ingots 10 are heated in a vertical heating chamber or pit 11 which is normally closed by a removable cover 12 to permit the ingots to be placed in and removed from the pit. The pit is large enough to accommodate a plurality of ingots standing on end and is usually elongate in plan. In the case of a pit which is elongate in plan a single burner 13 at one end of the pit will ordinarily suffice to heat the pit to the required elevated temperature to properly heat the ingots. The burner 13 is supplied with fuel through a supply pipe 14 having a control valve 15 and is supplied with air for combustion through a supply duct 16 having a control valve or damper 17.

Flue gas is exhausted from the pit 11 through an exhaust port 20 in the same end wall as the burner 13 but at a lower level. An exhaust flue 21 having a damper 22 connects the exhaust port 20 with a stack 23. Interposed in said flue 21 upstream from said damper is a recuperator 24 having separate passages for air and flue gas, respectively, so that the air is heated by heat exchange with the flue gas flowing through the recuperator. After passing through the recuperator the flue gas is relatively cool hence the damper 22 is in a relatively cool environment. The recuperator may be of any preferred type but for descriptive purposes may be considered as being of the type disclosed in patent to Stein, 1,404,721, dated January 24, 1922. Air from the atmosphere may be conducted to the air inlet side (the bottom side in the drawing) of the recuperator 24 by an air duct 25 having a damper 26. The air outlet from the recuperator 24 may be considered as being at the top side 28 thereof.

Figure 1:
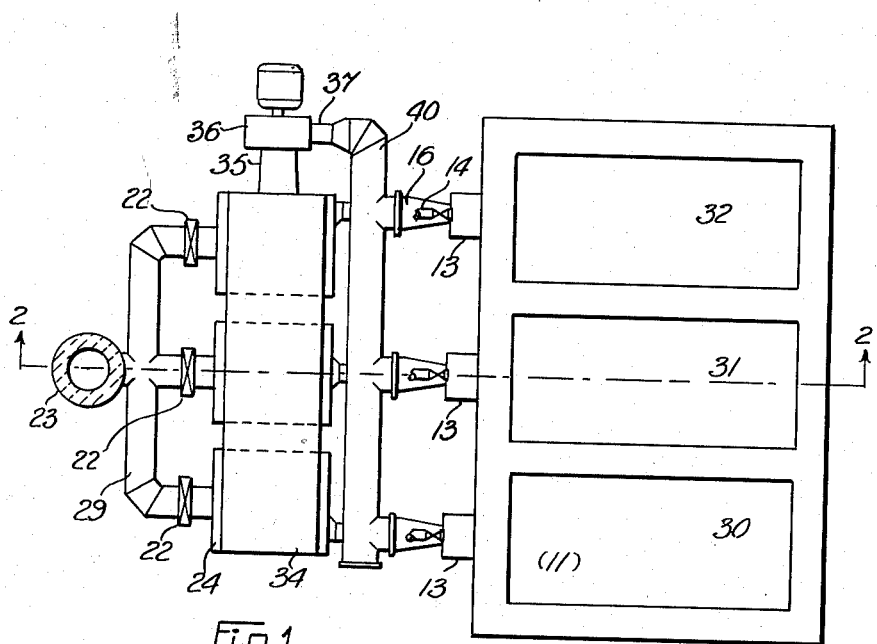
Fig. 1 is a schematic plan view of a soaking pit embodying the present invention.

In steel mills it is not uncommon to provide at one side a battery of heating chambers and it is with an installation comprising a battery of heating chambers 11 that the present invention is concerned. In Fig. 1 the several heating chambers corresponding to the heating chamber 11 are pits schematically indicated by 30, 31 and 32.

In the present invention the heated air from each of the several recuperators 24 (one for each of the several pits 11 or 30, 31 and 32) flows into a common air collecting header 34 which connects with the air outlet side 28 of said recuperators. A duct 35 connects one end of the air collecting header 34 with the suction side of a motor driven fan or blower 36 and a duct 37 connects the discharge of said blower with an air distributing manifold 40. The air supply ducts 16 for the several burners 13 extend as branches from said manifold 40 and therefore all of the combustion chambers receive combustion air at the same temperature at any given time. One of the important advantages of the arrangement is that a heating chamber containing relatively cold work receives combustion air at a substantially higher temperature than it otherwise would and therefore, other things being equal, the work is heated more rapidly than otherwise.

The invention also has the advantage that it permits the use of a single hot fan 36 for the entire battery of recuperators whereas conventional practice requires a hot fan for each recuperator.

What is claimed as new is:

In apparatus for heating work to elevated temperature, in combination, a plurality of furnace chambers each adapted to contain the work to be heated and each being independently internally fired, a waste gas flue leading from each of said chambers to a source of draft, a recuperator interposed in each of said flues for heating a current of air flowing through the recuperator, a hot air header common to all of said recuperators for receiving the heated air therefrom, an individual passage in each recuperator for air to be heated and to be delivered to said hot air header, a damper in each said air passage for controlling flow of air therethrough, and duct means for conducting heated air from said header to the several furnace chambers, whereby all of said chambers receive air for combustion at substantially the same temperature irrespective of the temperature of the flue gas from the individual chambers.

References Cited in the file of this patent
UNITED STATES PATENTS

| Number | Name | Date |
|---|---|---|
| 903,511 | Schmidt et al. | Nov. 10, 1908 |
| 1,335,203 | Smallwood | Mar. 30, 1920 |
| 1,344,437 | Buell | June 22, 1920 |
| 1,350,624 | Stein | Aug. 24, 1920 |
| 1,373,152 | Smallwood | Mar. 29, 1921 |
| 1,921,507 | Culbertson | Aug. 8, 1933 |
| 2,514,084 | Mowat | July 4, 1950 |